W. VOLKENING.
TRANSMISSION GEAR.
APPLICATION FILED APR. 11, 1912.
1,043,176.
Patented Nov. 5, 1912.
3 SHEETS—SHEET 1.
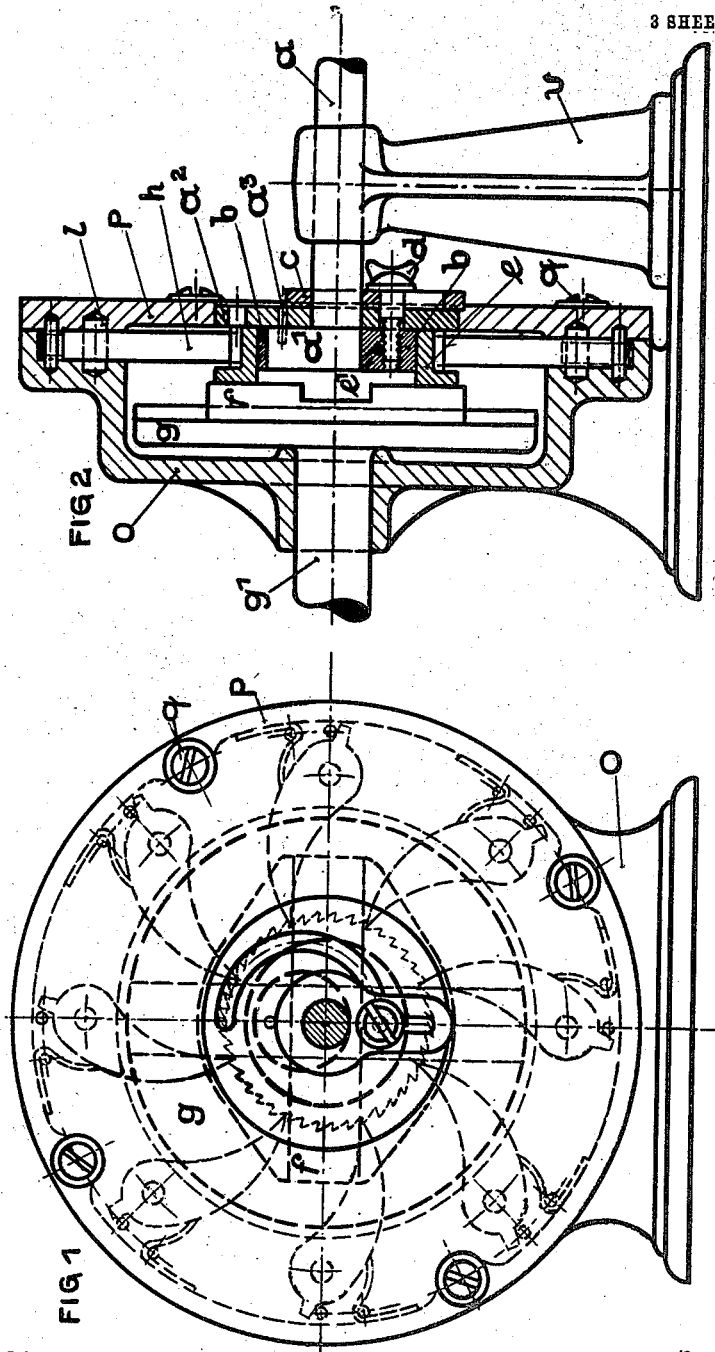
Witnesses:
Henry Hasper,
Inventor:
Walter Volkening

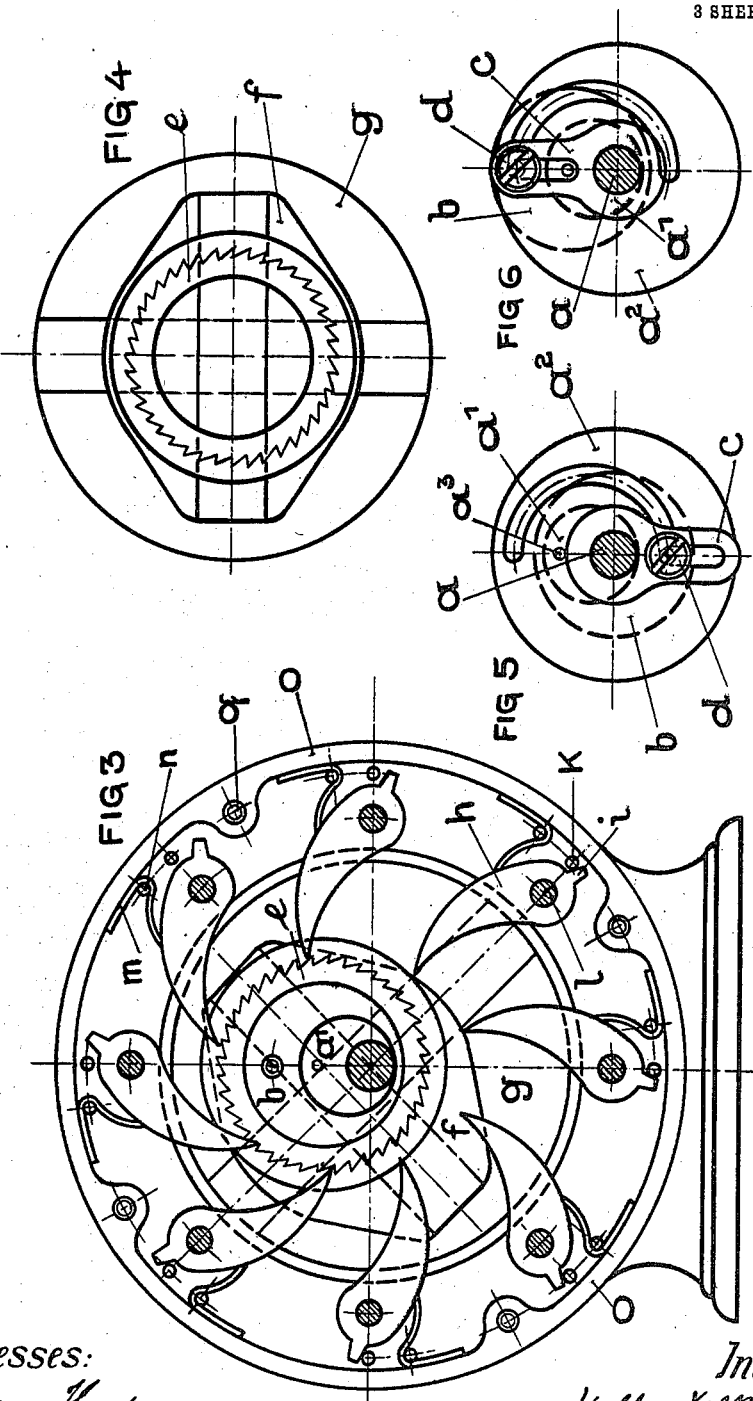

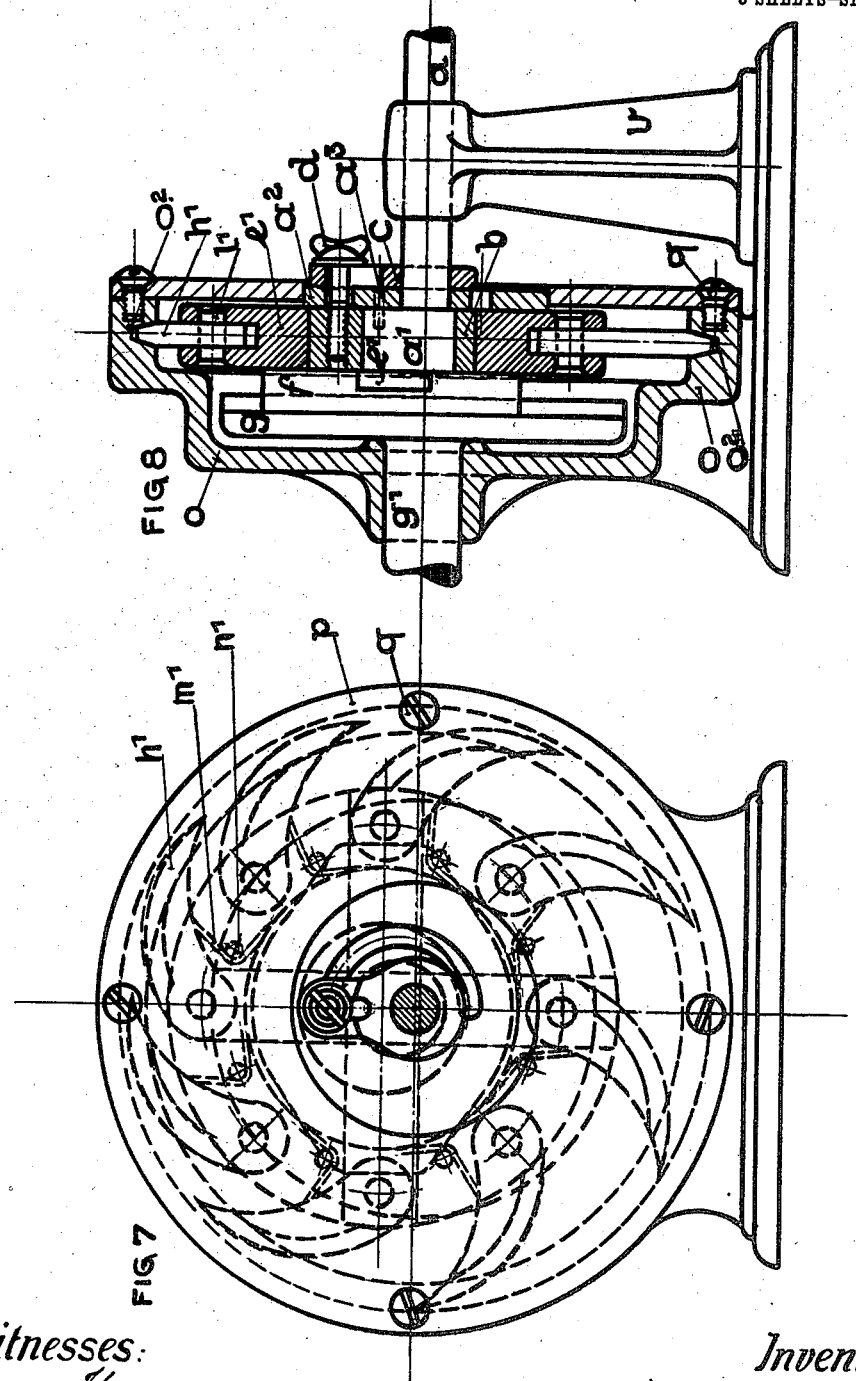

UNITED STATES PATENT OFFICE.

WALTER VOLKENING, OF BONN-ON-THE-RHINE, GERMANY, ASSIGNOR TO BRUNO GUSTAV KARL GOEBEL.

TRANSMISSION-GEAR.

1,043,176.  Specification of Letters Patent.  Patented Nov. 5, 1912.

Application filed April 11, 1912. Serial No. 689,984.

*To all whom it may concern:*

Be it known that I, WALTER VOLKENING, a subject of the Emperor of Germany, residing at Bonn-on-the-Rhine, Germany, have invented certain Improvements in Transmission-Gears, of which the following is a specification.

The present invention relates to a transmission gear of the kind in which a driving ring is actuated by an eccentric connected to the driving shaft, said ring being adapted to coöperate with arresting elements and with an adjustable clutch element for transmitting the rotation of said shaft to another shaft at changed speed.

The invention consists in the construction and arrangement of the arresting elements as hereinafter set forth and claimed, its object being to produce a simple gear mechanism which is reliable and satisfactory in its operation.

In the accompanying drawings the invention is illustrated, Figure 1 representing a front view of the gearing, Fig. 2, a sectional side view of the same, Fig. 3, another front view of the gearing with removed front cover, Fig. 4, a view of the adjustable clutch, Fig. 5, a view of the eccentric with its adjusting elements, and Fig. 6, another view of the eccentric adjusted into a different position. Fig. 7, is a front view of the gearing of a modified construction, and Fig. 8, a sectional view of the latter.

The driving shaft $a$ carries at one end a rigid eccentric disk $a^1$ on which another eccentric disk $b$ is loosely arranged. These disks are so constructed relative to one another that by turning the loose disk into different positions, its throw can be adjusted from *nil* (as shown in Fig. 5) to maximum (as shown in Fig. 6). For the purpose of such adjustment a circular disk $a^2$, of a diameter about equal to the largest diameter of the disk $b$, is arranged on the shaft and secured by means of a pin $a^3$ to the disk $a^1$. The disk $a^2$ is slotted for the admission of a screw-bolt $d$ which is screwed into the disk $b$ and which is also passed through a slot in a lever $c$, the latter being turnable about the shaft $a$ for the adjustment of the disk $b$. The screw-bolt may be fitted with wings allowing it to be conveniently tightened for securing the disk $b$ to the disk $a^2$ in various positions. The elements may also be adapted for adjustment while in motion, for which purpose any suitable known mechanism may be employed.

Loosely arranged on the disk $b$ is a driving ring which is connected to the driven shaft $g^1$ by an adjustable clutch element in such a manner that while the latter shaft is compelled to participate in the rotary movement of the ring, the clutch allows the center of the ring to be adjusted relative to the axis of the shaft. Any appropriate clutch may be employed for the purpose. According to the drawings the clutch is composed of a slide $f$ having at each side a groove of which one is carried at right angles to the other. This slide is arranged between the shaft ends, the shaft $g^1$ being fitted with a disk $g$ having on its face a rib which is in engagement with the groove of the slide. The groove at the opposite side of the slide is in engagement with lugs $e^1$ connected to the driving ring which can therefore be adjusted relative to the slide in one direction while the slide can itself be adjusted on the disk $g$ at right angles to such direction.

The shaft $g^1$ is supported in a stationary casing $o$ which incloses the gearing. One side of this casing is closed by a ring $p$ which is concentric with the disk $a^2$ and which is snugly accommodated to the latter. Screws $q$ serve to secure the ring $p$ to the casing. The shaft $a$ is supported by a pedestal $v$.

According to Figs. 1 and 4 the driving ring, which is designated $e$, is fitted on its circumference with ratchet teeth. In the plane of the ring a plurality of arresting elements in the shape of pawls $h$ are arranged which are loosely held on pivots $l$ secured to the casing $o$. These pawls are distributed equally about the ring and influenced by springs $m$ which, supported by pins $n$, tend to hold the bills of the pawls in engagement with the teeth of the ring. Pins $k$ limit the movement of the pawls by engagement with lugs $i$ on the latter, the arrangement being such that when the ring $e$ is concentric with the shaft, as shown in Fig. 1, its teeth are only just engaged by all the pawls. In this position the ring as well as the shaft $g^1$ remain stationary. If the disk $b$ is adjusted, however, so as to be eccentric, the ring $e$ will be adjusted accordingly and some of the pawls will be disengaged from the teeth. A subsequent rotation of the shaft $a$ to the right causes the ring $e$ to be moved by the disk $b$ against the pawls which thereby turn the ring, and with it the shaft $g^1$, in opposite direction. The ratio of transmission will be dependent upon the diameter of the ring $e$ as compared with the eccentricity of the disk $b$ and may be varied according to requirement.

In the construction shown in Figs. 7 and 8 the pawls $h^1$, instead of being connected to the casing, are connected to the driving disk $a^2$ which in this case is made without ratchet teeth. The pawls move about pivots $l^1$, secured to the ring, and are urged by springs $m^1$, supported by pins $n^1$, against the periphery of the casing $o$. The casing may be fitted with teeth for coöperation with the pawls, or the latter may, as shown in Fig. 8, be beveled and adapted for frictional engagement with a groove $o^2$ in the casing wall. In either case the effect of this construction is similar to the first one, the shaft $g^1$ being rotated owing to the motion imparted to the ring $e^2$ by the eccentric $b$ and to the engagement of the pawls with the casing wall.

Both constructions may be modified by making the disk $g$ stationary and adapting the casing $o$ to rotate. In this instance the casing would be rotated in the same direction as the driving shaft.

A reversal of the movement may be effected by the provision of two sets of pawls turned in opposite directions, one set being put out of action while the other set is working.

The simplicity of the gearing is evident, and its reliability is enhanced by the fact that the pivots of the pawls, since they always remain in the same position relative to each other, can be secured to one and the same element, either the casing or the driving ring.

I claim:

1. A transmission gear comprising a driving member, an eccentric connected thereto, a ring loosely arranged on said eccentric so as to be actuated thereby, a driven member, connections between said driven member and said ring compelling the former to participate in the rotary movement of the latter but allowing both to rotate about a different axis, a rigid casing inclosing the gear, and arresting elements engaging said elements and said ring so as to rotate the latter when it is moved by the eccentric.

2. A transmission gear comprising a driving member, an eccentric connected thereto, a toothed ring loosely arranged on said eccentric so as to be actuated thereby, a driven member, connections between said driven member and said ring compelling the former to participate in the rotary movement of the latter but allowing both to rotate about a different axis, a rigid casing inclosing the gear, and spring-actuated pawls pivoted to said casing so as to work on the teeth of the ring and rotate the latter when it is moved by the eccentric.

WALTER VOLKENING.

Witnesses:
HENRY HASPER,
WOLDEMAR HAUPT.